United States Patent [19]

Fearon

[11] Patent Number: 4,537,039

[45] Date of Patent: Aug. 27, 1985

[54] VAPOR COMPRESSION DISTILLING AND SALT CONCENTRATING DEVICE

[76] Inventor: Robert E. Fearon, 5246 S. 76th East Ave., Tulsa, Okla. 74145

[21] Appl. No.: 501,164

[22] Filed: Jun. 6, 1983

[51] Int. Cl.³ .............................................. B01D 3/02
[52] U.S. Cl. ..................... 62/182; 202/233; 202/234; 202/235; 202/DIG. 1; 203/24; 203/26
[58] Field of Search ........... 203/24, 26, 100, DIG. 17, 203/DIG. 24; 202/233–235, 176, 182, 200, DIG. 1; 159/24 B

[56] References Cited

U.S. PATENT DOCUMENTS

| | | | |
|---|---|---|---|
| 2,368,665 | 2/1945 | Kohman et al. | 202/49 |
| 2,487,884 | 11/1949 | Lunt | 202/75 |
| 2,696,465 | 12/1954 | Kittredge | 202/185 |
| 3,236,748 | 2/1966 | Pottharst, Jr. | 203/11 |
| 3,245,883 | 4/1966 | Loebel | 203/7 |
| 3,288,685 | 11/1966 | Kemper et al. | 203/11 |
| 3,382,157 | 5/1968 | Barnstead | 202/197 |
| 3,471,373 | 10/1969 | Pottharst, Jr. | 202/181 |
| 3,493,468 | 2/1970 | Arcari | 202/160 |
| 3,957,588 | 5/1976 | Humiston | 202/172 |
| 4,193,837 | 3/1980 | Wyss et al. | 159/6 W |
| 4,339,307 | 7/1982 | Ellis, Jr. | 202/176 |

*Primary Examiner*—Frank Sever

[57] ABSTRACT

A vapor compression distilling device (10) includes a first chamber (30) adapted to contain liquid (32) to be distilled. A compressor (70) is interconnected to the first chamber (30) for withdrawing vapor from the liquid (32) in the first chamber (30). The compressor (70) also functions to compress the vapor. A second chamber (12) is adapted to receive the compressed vapor from the compressor (70) such that the compressed vapor is condensed in the second chamber (12) into a liquid condensate. A device (16) is disposed in the second chamber (12) for boiling, concentrating and circulating the liquid (32) to be distilled. The device (16) is provided with circulating flow connections (18, 36) to the first chamber (30) and extends into the second chamber (12), such that the exterior of the device (16) is exposed to the compressed vapor generated by the compressor (70). Structure (44, 46) is provided for interconnecting the first chamber (30) and the second chamber (12) for selectively removing the device (16) from the second chamber (12).

10 Claims, 5 Drawing Figures

VAPOR COMPRESSION DISTILLING AND SALT CONCENTRATING DEVICE

TECHNICAL FIELD

This invention relates to distilling devices, and more particualrly to a vapor compression distilling and salt concentrating device.

BACKGROUND ART

A major problem in the distillation of seawater and brine, generated during the drilling of oil wells, is the formation of scale. The term "scaling" or "precipitation" as used herein, refers to the deposits which tend to form and build up on the heat exchange surfaces of vaporizing devices. Scale also becomes a particularly serious problem in salt concentrators, but is less serious in machinery intended only to take a small proportion of the water, rejecting a brine that is only slightly concentrated compared with the original input material. In every form of separation of salts from water, the problems multiply many fold when it is required to achieve a high degree of concentration of the solute materials.

The formation of scale causes a gradual reduction in the efficiency and rate of output of distillate. In thermal compression devices, an efficient apparatus for distilling seawater, scale formation not only decreases the output of the unit, but increases the horsepower necessary to drive the vapor compressor. The inefficiency caused by scaling greatly increases the cost of manufacturing distillate and therefore, it is customary to completely shut down the manufacturing process so that the scale can be removed from the heat exchange surfaces of the vaporizing device.

Even if efficiency is not the most important factor in a particular installation, frequent removal of scale is dictated because thick scale is more difficult to remove than thin scale. There is also a danger that thick particles of scale will flake off during operation of the distillation device and damage or cause undue wear to the apparatus. Conventional methods for removing scale include acid and chemical treatment in addition to ultrasonic vibrations. These methods are time consuming, costly and require lengthy shut downs of the distilling apparatus.

It is known that there are many factors which will influence the tendency and rate of scaling of the heat exchange surface by seawater or brine during the vaporization process. These factors include the retention time of the seawater within the vaporization chamber, the quantity of foreign matter in the seawater, the roughness of the heat exchange surface, the type of metal with which the seawater comes into contact within the distillation unit and the carbon dioxide equilibrium of the seawater. Solutions to the scaling problem have been proposed such as, for example, controlling certain operational conditions of the distillation apparatus. Such a proposal is described in U.S. Pat. No. 3,236,748 issued to Pottharst, Jr. on Feb. 22, 1966 and entitled "Process for Distilling Sea Water". However, such devices have required complicated structures and temperature monitoring devices to minimize scaling. Further, since the impurity of the brine which is to be distilled has a bearing on scaling, it is difficult to consistently control the operating parameters of the distillation apparatus.

An additional factor relating to the efficient operation of vapor compression distilling and concentrating devices is the presence of air in the incoming raw unconcentrated brine. The air dissolved in the raw brine results in continually increasing the concentration of air mixed with the generated vapor thus decreasing the efficient performance of the system.

A need has thus arisen for a vapor compression distilling and concentrating device which provides for easy removal of the heat exchange device so that the heat exchange surfaces can be readily cleaned of scale to avoid costly downtime of the distillation device. A need has further arisen for a distillation device which provides for the removal of dissolved air being carried into the system by the raw unconcentrated brine. A need has further arisen for a distillation device which is simple in operation to minimize the cost of manufacturing distillate and which provides for efficient concentrate disposal.

DISCLOSURE OF THE INVENTION

In accordance with the present invention, a device for vapor compression distilling and salt concentrating is provided which substantially eliminates the problems of scaling heretofore associated with such distillation devices.

In accordance with the present invention, a vapor compression distilling device includes a first chamber adapted to contain liquid to be distilled. A compressor is interconnected to the first chamber for withdrawing vapor from the liquid in the first chamber. The compressor also functions to compress the vapor. A second chamber is adapted to receive the compressed vapor from the compressor such that the compressed vapor is condensed in the second chamber into a liquid condensate derived from the vapor. A device is disposed in the second chamber for boiling, concentrating and circulating the liquid to be distilled. The device is provided with circulating flow connections to the first chamber and extends into the second chamber, such that the exterior of the device is exposed to compressed vapor generated by the compressor. Structure is provided for interconnecting the first and second chambers for selectively removing the device from the second chamber.

BRIEF DESCRIPTION OF THE DRAWING

For a more complete understanding of the present invention and for further advantages thereof, reference is now made to the following Detailed Description taken in conjunction with the accompanying Drawings in which.

DETAILED DESCRIPTION

Figure 1:
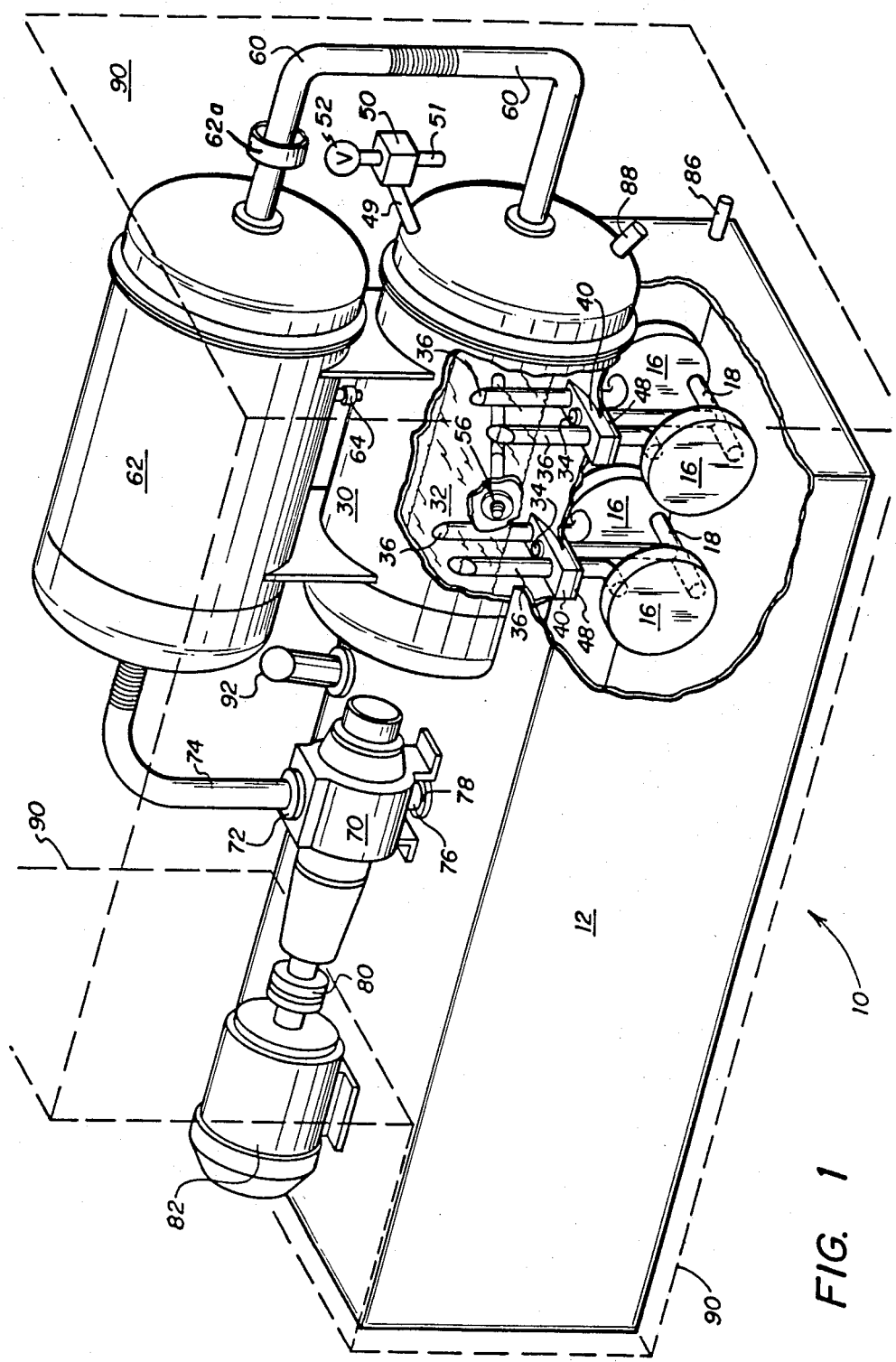
FIG. 1 is a perspective view of the present vapor compression distilling and salt concentrating device.

Referring now to FIG. 1, the present vapor compression distilling and salt concentrating device is illustrated, and is generally identified by the numeral 10. For simplicity of description, the present invention will be described as applied to a vapor compression distilling device for obtaining distilled water from brine generated during the drilling of oil wells or from seawater. It will be understood that the present invention also has application to vapor generators generally including stills and evaporators in which interest is centered on recovery of concentrate rather than on the vapor produced or condensate therefrom. The present invention also has application to the recovery of the salt from the brine for subsequent disposal.

The present device 10 resembles a conventional vapor compression distilling device. Such devices recirculate brine through tubes receiving heat from compressed steam, the latent heat of which is given up to the brine providing evaporation of water from the brine in the form of relatively low pressure steam. The action of a compressor adds heat to the steam and also provides the compressed steam at sufficiently high pressure that, even though its temperature may be substantially above that of the brine, the steam will condense whereas the brine will evaporate.

Referring again to FIG. 1, device 10 includes a steam chamber 12 which houses boiler, circulator and concentrator (BCC) devices 16. While two pair of such BCC devices 16 are illustrated in FIG. 1, it is understood that two pair of BCC devices 16 are shown for illustrative purposes only, it being understood that additional or fewer devices 16 may be utilized with the present invention.

Figure 2:
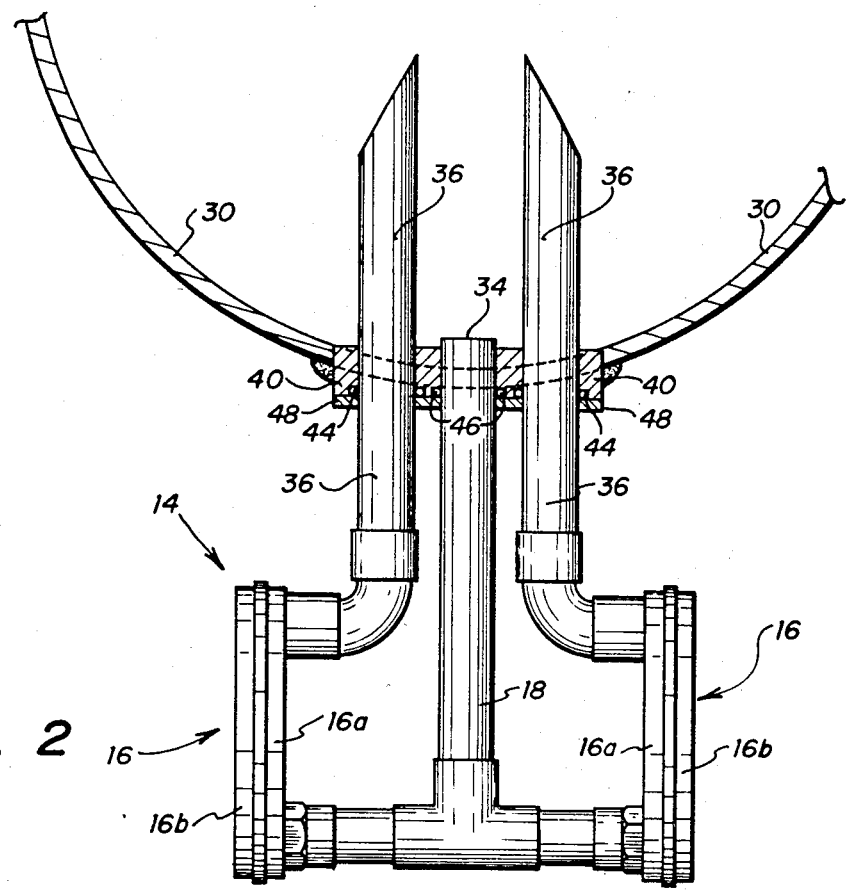
FIG. 2 is a side elevational view of a boiler, circulator and concentrator device of the present invention.

Referring simultaneously to FIGS. 1 and 2, BCC devices 16 are hollow and substantially disc shaped. Each BCC device 16 is made by, for example, soldering two spinnings 16a and 16b derived from sheet copper, such that the solder joining the edges of the spinnings, 16a and 16b, produce the space between the spinnings.

BCC devices 16 are interconnected by a "T" shaped conduit 18. Conduit 18 is in fluid communication with the interior of a chamber 30 which contains separator brine 32. Separator brine 32 enters conduit 18 through an aperture 34 at the top of conduit 18. Brine 32 once heated by BCC devices 16 is returned to the interior of chamber 30 via a pair of pipes 36. It therefore can be seen that the separator brine 32 circulates throug BCC devices 16 via conduit 18 and returns to chamber 30 via pipes 36. Conduit 18 and pipes 36 are plugged into a fixture 40 which is attached to chamber 30.

An important aspect of the present invention is the interconnection between chamber 30 and steam chamber 12. Conduit 18 and pipes 36 pass between steam chamber 12 and chamber 30 in a fluid tight relationship through the use of O-rings 44 mounted around pipes 36 and an O-ring 46 mounted around conduit 18 at its aperture 34. O-rings 44 and O-ring 46 are compressed by a plate 48. The use of O-rings 44 and 46 permit chamber 30 to be seated over BCC devices 16, conduit 18 and pipes 36 in a fluid tight relationship to seal both steam chamber 12 and chamber 30. Further, an important aspect of the present invention is that the interconnection between steam chamber 12 and chamber 30 permits BCC devices 16 to be readily removable from steam chamber 12 for cleaning scale build up on BCC devices 16. Alternatively, BCC devices 16 can be easily replaced in a short period of time without lengthy shut down of device 10.

An additional aspect of the present invention is that the function of steam chamber 12, being transfer of heat and boiling of brine 32, is articulated from the function of chamber 30, being the separation of vapor from separator brine 32. The interconnection between chamber 12 and chamber 30 facilitates the separation of these functions.

Referring again to FIG. 1, separator brine 32, after preheating and deaeration enters chamber 30 through an inlet port 49. The preheating of brine 32 will subsequently be described with reference to FIG. 4.

The present invention also provides for the removal of dissolved air being carried into device 10 by the raw unconcentrated brine. An air trap is provided in an accumulator 50 which receives raw unconcentrated brine through an inlet port 51. Air is vented to the atmosphere through a valve 52. A failure to de-aerate the incoming brine results in continually increasing concentration of air mixed with the vapor. The presence of air is inimical to efficient performance of the device 10. A pressure measurement and pressure control with arrangements to maintain the pressure in the entire system at a small pressure difference above the pressure of the atmosphere surrounding the equipment is provided in the present system. This pressure difference and pressure control arrangement affords a certainty that air will not enter the system once it is in operation, for the reason that all leaks are outward.

Disposed within chamber 30 are anode assemblies 56 which operate to provide cathodic protection to prevent corrosion of chamber 30 by the separator brine 32 contained therein. Only one such anode assembly 56 is illustrated in FIG. 1, it being understood that additional anode assemblies can be utilized. Anode assemblies 56 will subsequently be described with reference to FIG. 5.

Vapor being compressed in steam chamber 12 surrounding BCC devices 16 raises the temperature of the separator brine 32 contained within BCC devices 16 causing the separator brine 32 to boil. The vapor bubbles rise through separator brine 32 thereby entraining more separator brine 32 and pass upward through pipes 36 to escape at the surface of separator brine 32 within chamber 30. The separator brine supply within boilers 16 is continuously refreshed from chamber 30 as separator brine 32 passes through conduit 18. The circulation occurs through BCC devices 16 on a continuous basis such that the vapor bubbling through BCC devices 16 from pipes 36 rises to the top of chamber 30 and passes through a flexible conduit 60 to a vapor train filter chamber 62. A check valve 62a is provided in conduit 60 to prevent water from passing into chamber 62. A check valve 64 is disposed between chamber 62 and chamber 30. The operation of chamber 62 and check valve 64 will subsequently be described with reference to FIG. 3.

Located above steam chamber 12 is a compressor 70. Compressor 70 has an intake port 72 which receives a flexible conduit 74. Conduit 74 is interconnected to vapor train filter chamber 62 and receives vapor which has passed through vapor train filter chamber 62. Vapor which has passed through vapor train filter chamber 62 is compressed by compressor 70. The compressed vapor is returned to steam chamber 12 via a conduit 76 which passes through a vapor inlet port 78 located in the top of steam chamber 12.

Compressor 70 may comprise, for example, a three-lobed pump, such as, for example, a root blower. Compressor 70 is driven through a flexible drive 80 by a compressor motor 82.

Condensate generated by compressor 70 accumulates in the bottom of steam chamber 12 and on the exterior of BCC devices 16. The condensate is substantially free from the salt associated with the initial separator brine 32. The water of the condensate is withdrawn from steam chamber 12 through an outlet port 86.

It therefore can be seen that separator brine 32 circulating within BCC devices 16 is partly converted to steam which is heterogeneously mingled with the brine 32 being concentrated, thereby lowering the average density of the heterogeneous mixture. The heterogeneous mixture causes a rapid rise of liquid in pipes 36 and brings about rapid circulation of the brine being concentrated as the brine passes through devices 16 over the surfaces where the steam bubbles form. Because of the loss of part of the brine into vapor, the brine liquid portion of the heterogeneous mixture is immediately more concentrated than it was before the bubbles were evolved. Because of the rapid circulation of the heterogeneous liquid vapor mixture over the surfaces where the steam bubbles were formed, and the rapid renewal of fresh, less concentrated brine on these surfaces, super saturation of sparingly soluble salts is avoided, and scale formation is thereby diminished.

Outlet port 86 is interconnected to water pumps (not shown) for pumping the water from steam chamber 12. Brine concentrate is removed from chamber 30 through an outlet port 88.

The water pumps work as a proportional pumping system, synchronized with the proportional pumping of the concentrated brine and the proportional pumping of the input brine from the source. All the proportional pumps are set to pump at a rate slightly higher than that which is needed. An adjustable throttle associated with each pump is set in such a manner that the given pump, when bypassed through the throttle, pumps slightly less than the required amount. The proportional pumps so operated pass from a condition of pumping a little faster than necessary to a condition of pumping a little less rapidly than necessary. They run all the time.

The amount of raw brine entering chamber 30 and the amount of concentrated brine removed from chamber 30 through outlet port 88 is controlled by a proportional pumping system (not shown) that delivers brine 32 at an approximately constant rate, and removes the concentrated brine at rates corresponding with the actual proportions in which these materials are produced.

The entire device 10 except for compressor motor 82 may also be contained in a temperature controlled oven 90. Oven 90 may be maintained at a temperature in the range of approximately, for example, 220° F. Oven 90 produces a controlled environment for device 10 to minimize the effects of temperature excursions in the ambient environment. The exterior of oven 90 may also be provided with thermal insulation to diminish the loss of heat energy.

A valve 92 is connected to steam chamber 12 for allowing steam chamber 12 to communicate with the outside atmosphere. Valve 92 assists to exclude air from device 10 as will subsequently be further described. Valve 92 is set to leak steam from device 10 at a rate which may approximate about 2% of the total production of water, thereby allowing the leakage to go to the outside area. Valve 92 and the leakage arrangement functions to guarantee the continuing absence of air and the presence of pure vapor of water only in the operating portions of system 10.

Figure 3:
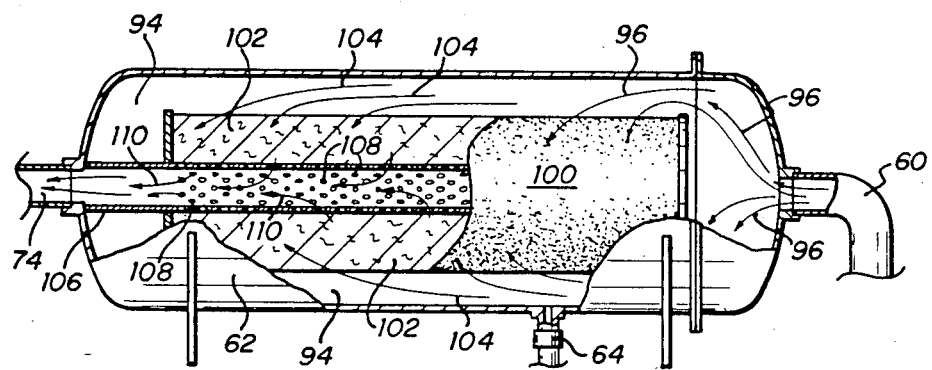
FIG. 3 is a side view, partially in section, of the vapor train filter chamber of the present invention.

Referring now to FIG. 3, the filter structure of vapor train filter chamber 62 is illustrated. Water vapor substantially free of air enters chamber 62 through flexible conduit 60 into an air space 94 following the path of arrows 96. Disposed within chamber 62 is a cylindrical filter element 100. The material for filter element 100 is selected depending upon the types of materials chamber 62 is to absorb or recover from the water vapor substantially free of air entering chamber 62 and may comprise, for example, spun stainless steel 102. Filter element 100 may also include, for example, sodium carbonate, activated charcoal, or similar material to absorb hydrogen sulfide, mercaptans and organic acid vapors or additional materials depending upon the vapors present. Vapor enters filter 100 in the direction indicated by arrows 104.

Disposed within the center of chamber 62 and surrounded by filter element 100 is a steam pump input tube 106. Steam pump input tube 106 includes a plurality of perforations 108 within the walls of steam pump input tube 106. Due to operation of compressor 70, vapor passes from air space 94 through filter element 100 and through perforations 108 into steam pump input tube 106. The filtered vapor indicated by arrows 110 then passes into conduit 74.

The vapor stream is thereby filtered by operation of filter element 100. Water droplets containing salt are thereby filtered from the steam substantially free of air entering chamber 62. The droplets filtered by filter element 100 then drain through check valve 64 into chamber 30. Chamber 62 thereby operates to prevent droplet input to compressor 70, which would be corroded by such concentrated brine droplets, and droplet input into steam chamber 12 which contains the fresh water.

Figure 4:
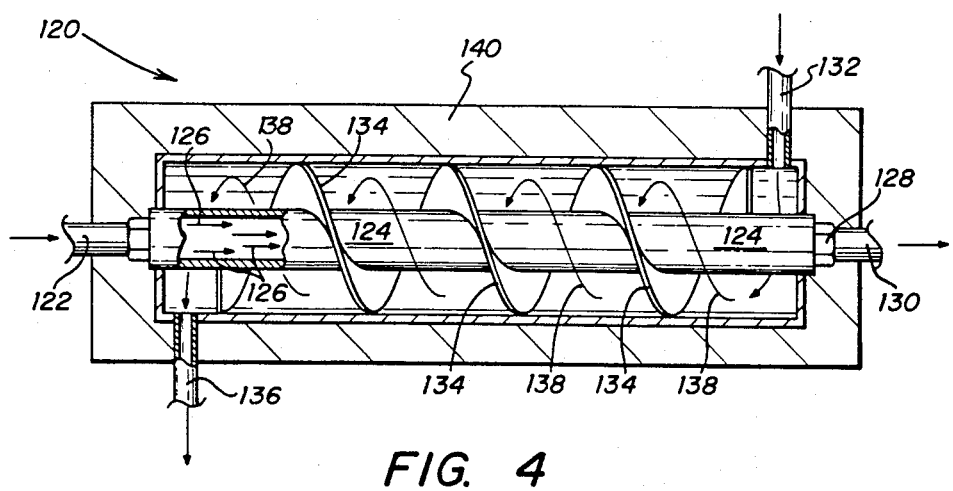
FIG. 4 is a diagrammatic illustration of the counter current heat exchanger of the present invention.

Referring now to FIG. 4, as previously stated, raw brine entering chamber 30 through inlet port 49 is preheated. FIG. 4 illustrates the present counter current heat exchanger, generally identified by the numeral 120 for preheating the raw brine. Raw brine enters heat exchanger 120 through an inlet port 122. Centrally disposed within heat exchanger 120 is a conduit 124. Raw brine passes through conduit 124 in the direction of arrows 126 to an exit port 128. The brine passing from exit port 128 is transported to inlet port 51 (FIG. 1) via a conduit 130.

The heat source for heat exchanger 120 is provided by the concentrated brine within chamber 30 (FIG. 1) which is removed from chamber 30 via outlet port 88. The concentrated brine flowing from chamber 30 enters heat exchanger 120 through an inlet port 132. The concentrated brine flows in a helical path created by an internal helix scrubber 134 to an outlet port 136. The path of the concentrated brine entering inlet port 132 is indicated by arrows 138. Scrubber 134 circulates the flow of the hot concentrated brine entering inlet port 132 to allow maximum heat transfer to the raw brine 32 passing through conduit 124 flowing to inlet port 52 of chamber 30. Brine passing from outlet port 136 is a cool concentrated brine which can then be stored or otherwise disposed.

In addition to using the concentrated brine as a heat source, the effluent fresh water is also used as a source of heat for a separate heat exchanger equivalent to heat exchanger 120. In the second heat exchanger 120 outlet port 86 is connected to inlet port 132 to provide distilled water to heat exchanger 120 as the heat source. The distilled water passing from outlet 136 is cool distilled water and can then be stored or otherwise disposed. By using the heat of the distilled water, there is a heat recovery of approximately 30,000 BTU per hour.

Counter current heat exchanger 120 and a separate exchanger discussed above are insulated using insulation 140, or equivalent, to avoid loss of heat from heat exchanger 120 or its equivalent to the atmosphere. Heat exchanger 120 located exterior of oven 90 (FIG. 1).

Figure 5:
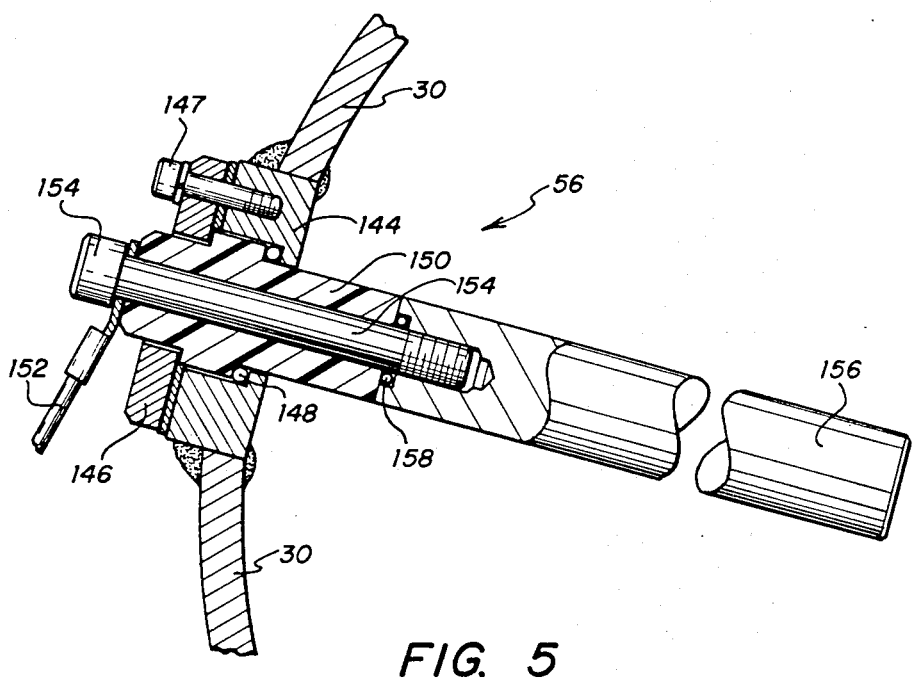
FIG. 5 is a side elevational view, partially in section, of the anode assembly of the present invention.

FIG. 5 illustrates an anode assembly 56 which provides cathodic protection to prevent corrosion of chamber 30. Anode assembly 56 is mounted through chamber 30 using a flange 144 which is welded to chamber 30. Anode assembly 56 is mounted to flange 144 and is held in place using a plate 146 and bolt 147. An O-ring seal 148 is disposed between anode assembly 56 and flange 144. Anode assembly 56 is insulated from chamber 30 using insulation 150. Electrical input is applied from a terminal 152 connected to a bolt 154 which extends through insulation 150 to a replaceable anode element 156. Anode element 156 is threadedly received by bolt 154. An O-ring seal 158 is disposed between anode element 156 and bolt 154.

In operation of the present device 10, it is necessary to exclude air from device 10 to achieve efficient operation of the system. Air is purged from device 10 by raising the temperature of the entire system until steam, generated from water initially present within steam chamber 12, is evolved through a vent (not shown) in steam chamber 12 exhibits a constant temperature. As the temperature of the system rises, steam derived from the fresh water initially present in steam chamber 12 constitutes a higher and higher proportion of the atmosphere in the system, ultimately arriving at a point where the system is void of all air initially present. The equilibrium temperature of the vented steam reflects the degree of saturation of the steam to finally arrive at the boiling point corresponding with the elevation where the device 10 is to be used which is a constant temperature which represents the fulfillment of the requirement to void all air within device 10.

It therefore can be seen that the present invention provides for a compression distilling and salt concentrating device having improved efficiency in that the problem of scaling is substantially minimized. The device utilizes discrete chambers for boiling the brine and for separation of the vapor and the liquid. Further, the present invention provides a filter for separating entrained droplets from the vapor. Further, the BCC device associated with the present invention can be readily removed for easy cleaning or complete replacement without lengthy shut-down time of the system.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. In a vapor compression distilling device including:
   (a) an internal area where the scale will concentrate during operation,
   (b) a first chamber adapted to contain the liquid to be distilled,
   (c) a compressor means connected to the vapor space above the liquid in said first chamber for withdrawing vapor from the said vapor space in the said first chamber and compressing said vapor, and
   (d) a second chamber adapted to receive the compressed vapor from the said compressor such that the compressed vapor is condensed therein into a liquid condensate derived from said compressed vapor, the improvement comprising a means for enabling replacement of said area, designed to be plugged into or out of said device.

2. The device of claim 1 in which the said means containing the said area where scale concentrates is adapted to circulate the liquid being distilled, the circulation being brought about by the movement of bubbles of steam.

3. The device of claim 1 wherein the internal area means where scale will concentrate is provided in a device comprised of metallic walls apporpriately thin, to permit efficient flow of heat through the walls of said device.

4. The device of claim 1 wherein the included means where scale will concentrate is constructed of a metal that can resist the chemical attack of concentrated brine, such as copper.

5. The device of claim 1 wherein the replaceable means comprising the area where scale will concentrate is presented as a plurality of equal structures, each of which is separately replaceable, the said structures being interchangeable.

6. The device of claim 1 wherein the entire structure of the device, excepting electric motors, is contained within a heat insulating housing provided with heating means capable of maintaining a specified temperature substantially higher than ambient temperature.

7. The device of claim 1 wherein a vapor train filtering means is provided to prevent drops of liquid brine from arriving in the distilled product.

8. The device of claim 1 wherein there is provided a vapor train filtering system capable of removing foreigh substances from the vapor by chemical absorption.

9. The device of claim 1 wherein there is provided means for excluding air from the distillation device in its entirety.

10. The device of claim 1 in which the structure containing the area where scale concentrates is provided with a plurality of at least two upward fluid conducting pathways, at least one of the said fluid conducting pathways connecting to the said structure substantially below its top and at least one of the said fluid conducting pathways connecting to the said structure substantially at the highest point thereon.

* * * * *